United States Patent
Fell et al.

(10) Patent No.: US 6,698,271 B1
(45) Date of Patent: Mar. 2, 2004

(54) PROCESS FOR REDUCING BIAS ERROR IN A VIBRATING STRUCTURE SENSOR

(75) Inventors: Christopher Paul Fell, Plymouth (GB); Ian David Hopkin, Plymouth (GB); Kevin Townsend, Plymouth (GB)

(73) Assignee: Bae Systems, PLC., Farnborough (GB)

( * ) Notice: Subject to any disclaimer, the term of this patent is extended or adjusted under 35 U.S.C. 154(b) by 0 days.

(21) Appl. No.: 09/450,688

(22) Filed: Nov. 30, 1999

Related U.S. Application Data

(63) Continuation of application No. PCT/GB98/02057, filed on Jul. 13, 1998.

(51) Int. Cl.⁷ .................................................. G01P 9/04
(52) U.S. Cl. ................................... 73/1.37; 73/504.13
(58) Field of Search .................... 73/504.02, 504.04, 73/504.12, 504.13, 1.37, 1.38, 1.77, 1.84

(56) References Cited

U.S. PATENT DOCUMENTS

| | | | | |
|---|---|---|---|---|
| 4,038,876 A | * | 8/1977 | Morris ....................... | 73/1.38 |
| 5,218,867 A | * | 6/1993 | Varnham et al. .......... | 73/504.13 |
| 5,629,472 A | * | 5/1997 | Varnham et al. ........... | 73/1.37 |
| 5,703,292 A | * | 12/1997 | Ward ........................ | 73/504.02 |
| 6,155,115 A | * | 12/2000 | Ljung ...................... | 73/504.12 |

FOREIGN PATENT DOCUMENTS

| | | | |
|---|---|---|---|
| GB | 2 251 072 | | 6/1992 |
| GB | 2272053 | * | 5/1994 |

\* cited by examiner

*Primary Examiner*—Helen Kwok
(74) *Attorney, Agent, or Firm*—Kenyon & Kenyon

(57) ABSTRACT

Bias error is reduced in a vibrating structure sensor having primary and secondary pick-offs separated by a fixed angular amount (45°) with respect to the vibrating structure by summing a proportion of the primary pick-off output signal into the secondary pick-off output signal or subtracting a proportion of the primary pick-off output signal from the secondary pick-off output signal effectively to reduce or increase the angular separation of the secondary pick-off from the primary driver by an amount sufficient to set the rate output signal from the vibrating structure to zero and thereby minimize bias error.

3 Claims, 6 Drawing Sheets

Fig.1A. *PRIOR ART*
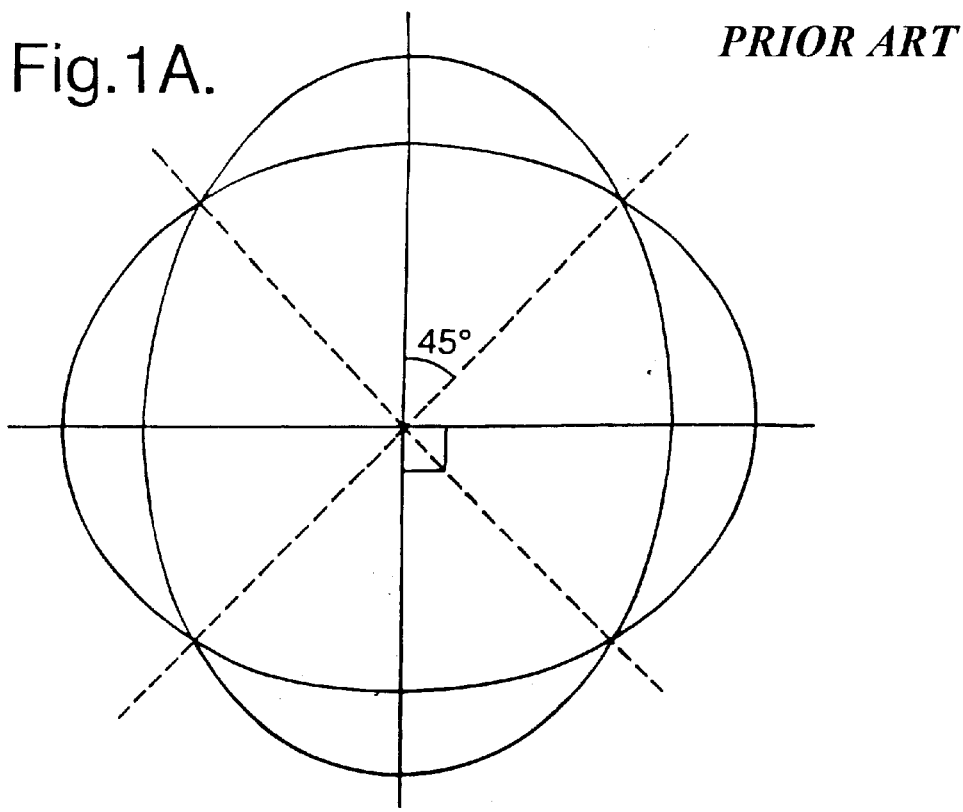
Fig.1B. *PRIOR ART*
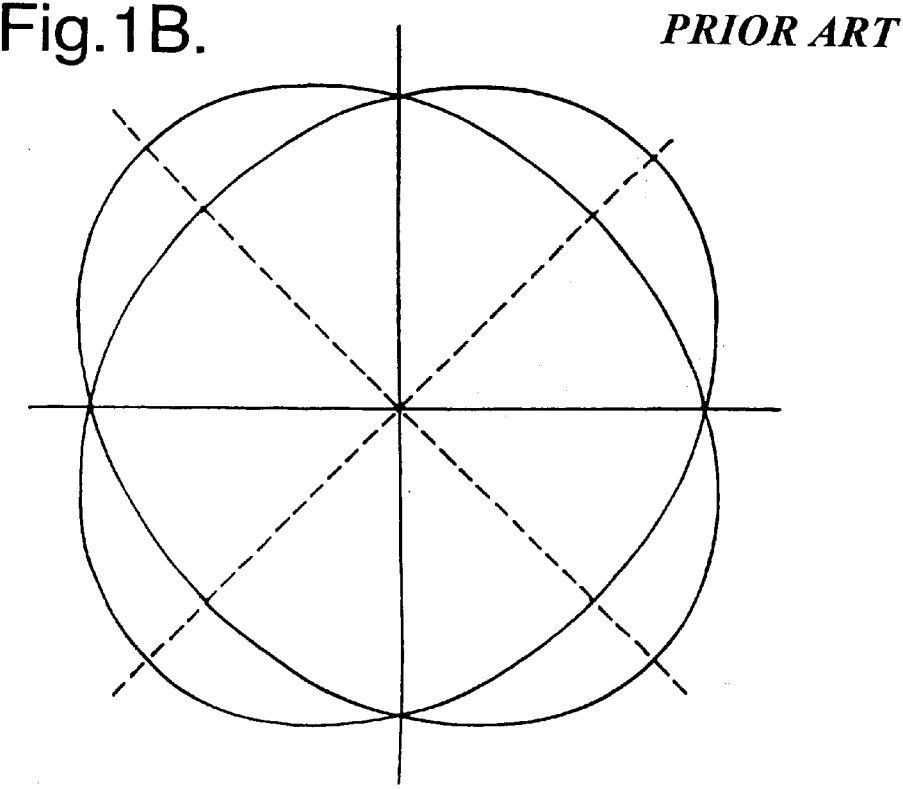

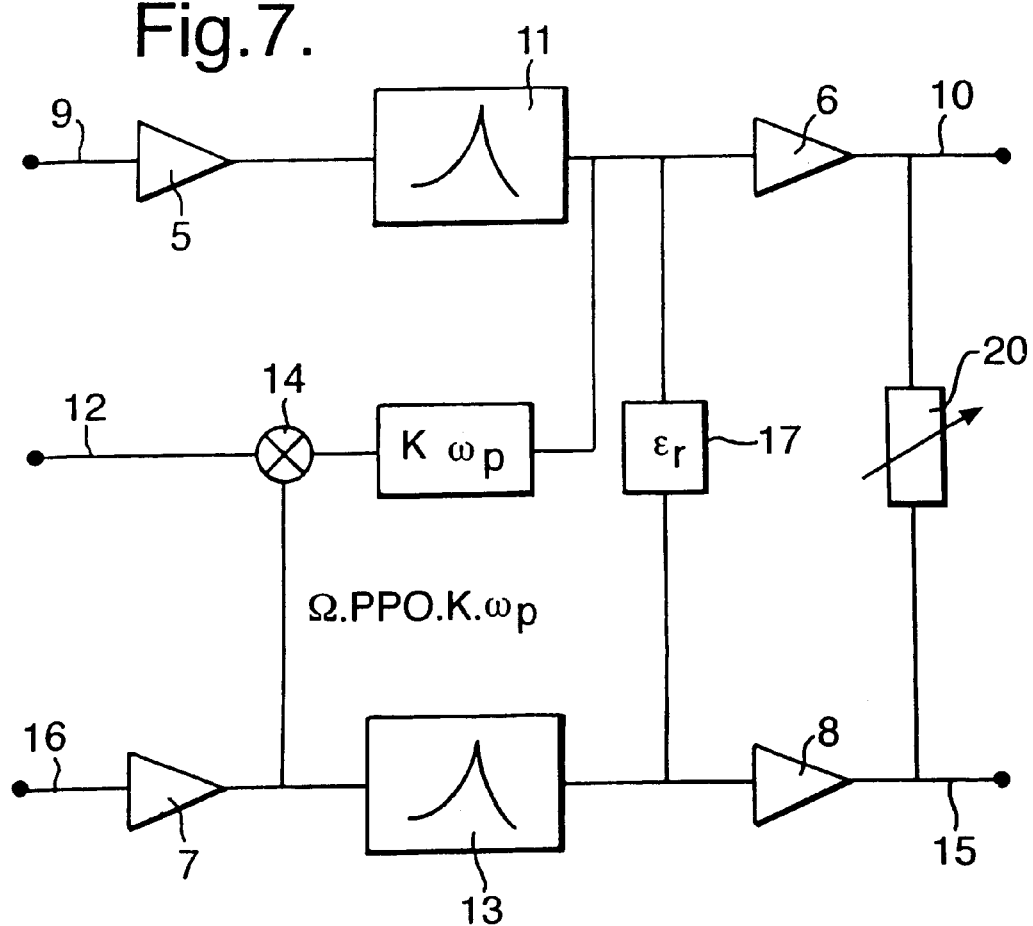

PROCESS FOR REDUCING BIAS ERROR IN A VIBRATING STRUCTURE SENSOR

This application is a continuation of PCT/GB98/02057 filed Jul. 13, 1998.

BACKGROUND OF THE INVENTION

This invention relates to a process for reducing bias error in a Vibrating Structure Sensor, particularly but not exclusively, suitable for use with a Vibrating Structure Gyroscope and to a Vibrating Structure Sensor.

SUMMARY OF THE INVENTION

Vibrating structure sensors such as gyroscopes may be constructed using cylindrical or planar ring structures as the vibrating element. These are typically excited into a cos 2θ resonance mode. For a perfectly symmetric vibrating structure the cos 2θ mode actually exists as a degenerate pair of vibration modes at a mutual angle of 45°. The vibrations are shown schematically in FIGS. 1A and 1B. One of these modes (FIG. 1A) is excited as the carrier mode. When the structure is rotated around the axis normal to the plane of the vibrating structure Coriolis forces couple energy into the response mode (FIG. 1B). The carrier mode vibration typically is maintained at a constant amplitude at the peak resonance frequency. When the sensor body is rotated Coriolis forces couple energy into the response mode. The amplitude of motion of the response mode is directly proportional to the applied rotation rate.

The vibrating structure may be driven into resonance by various drive means including electromagnetic, electrostatic, piezo-electric, optical or thermal expansion. The induced motion may similarly be detected by various pick-off means, including electromagnetic, piezo-electric or optical. The orientation of the drives and pick-off means around the resonant structure are shown schematically in FIG. 2. The primary drive means 1 excites the resonant carrier motion which is detected by the means 2 which is located at 90° to the primary drive means 1. It is usual to operate the structure with the primary pick-off means output constant to maintain a constant carrier mode amplitude. The secondary pick-off means 3 is located 135° from the primary drive means 1 and is used to detect the response mode motion. For a perfectly radially symmetric vibrating structure, there will be no response mode motion in the absence of an applied rotation. The secondary pick-off signal output will be directly proportional to the applied rotation rate. An additional secondary drive means 4, positioned at 45° to the primary drive means 1, may be employed to operate the sensor in a forced feedback or closed-loop mode. In this mode, the secondary pick-off output is nulled by applying a force on the secondary drive means 4. The applied force is equal and opposite to the rotation induced Coriolis force and there is thus no resultant response mode motion.

The performance of the sensor is characterized in terms of its scale factor and bias stability over the range of operating conditions. It is generally preferable to operate the sensor in a closed-loop configuration as this gives superior scale factor performance to the open-loop configuration. This is due to the fact that, with the response mode motion nulled, its dynamic behavior does not affect the rate response so variations in the quality factor, Q, over temperature will not affect the scale factor response.

FIG. 3 shows a simplified block diagram of a conventional sensor control system operation.

In FIG. 3 the system includes a primary drive amplifier 5, a primary pick-off amplifier 6, a secondary drive amplifier 7 and a secondary pick-off amplifier 8. A primary drive input at 9 excites the carrier mode resonance and maintains a constant signal, and hence a constant amplitude of motion, at the primary pick-off output 10 for the primary resonance indicated at 11. An applied rate, Ω at 12 will thus produce a Coriolis force which couples energy from the primary carrier mode into the secondary resonance or response mode 13. In FIG. 3, this coupling is represented substantially by a multiplier 14. The force $F_c$ is given by:

$$F_c = \Omega.PPO.K.\omega_p \tag{1}$$

where PPO is the primary mode amplitude, $\omega_p$ is the primary drive frequency and K is a constant. This motion is detected and amplified by the secondary pick-off amplifier 8. In the open-loop mode, this signal amplitude is a direct measure of the applied rate. In closed-loop operation, the secondary pick-off signal output 15 is fed back to the secondary drive input 16. The secondary drive then applies a force driving to the response mode such that the secondary pick-off output 15 is nulled. In the absence of any errors, this force will be equal and opposite to the Coriolis force and thus there will be no net response mode motion. The amplitude of the applied force is proportional to the applied rate Ω.

Detailed modeling of the control loops and resonator modal behavior enables the primary error sources to be identified and quantified. The dominant source of bias error is found to arise from the misalignment angle, $\epsilon_r$, between the primary drive 9 and secondary pick-off 15 (i.e., deviation from 135°). The contribution of this error mechanism to the bias is given by:

$$Biase \propto \frac{f\epsilon_r}{Q} \tag{2}$$

where f is the resonant frequency. The magnitude of this error is directly proportional to f and inversely proportional to Q. In practical sensors f is relatively stable over the operating temperature range. The Q value, however, is an inherent material property which may vary significantly over the operating temperature range, thus giving rise to a significant bias variation. In the system block diagram (FIG. 3), this error is represented by a coupling 17 between primary and secondary channels which adds a portion of the primary mode motion into the secondary pick-off output 15. In order to maintain the pick-off output 15 at zero, the response mode must be driven such that the motion is equal and opposite to the error being summed in. The input to the response mode resonance is no longer zero so the secondary drive is not a true representation of the applied rate Ω.

In the above discussion, it has been assumed that the carrier mode and response mode frequencies are exactly matched. In practice, material anisotropies and manufacturing tolerances have given rise to some degree of mismatch in these frequencies. Techniques for bringing these frequencies into balance are known and are described, for example, in EP 0411489 B1 and GB 2272053 A. The general procedure involves bringing the modes into alignment with the drives and trimming the split between their resonance frequencies to within a specified tolerance. This is achieved by controlled adjustment of the stiffness or mass at appropriate points around the structure.

In order to optimize the gyro performance the secondary pick-off misalignment error, $\epsilon_r$, must be minimized. This is conveniently done as part of the vibrating structure balancing procedure and is achieved by adjusting the effective position of either the primary drive means 1 or the secondary pick-off means 3. The balancing procedure is performed with the sensor effectively operating open loop. With the primary drive means 1 on resonance, the observed secondary pick-off output 15 will vary depending on the primary drive to carrier mode alignment angle.

The modelled secondary pick-off response, with no misalignment error, is shown in FIG. 4 for a carrier mode frequency of 5 kHz with a frequency split of 0.2 Hz and a Q of 5000. These are typical resonator mode parameters for a known vibrating structure sensor. The response has been resolved into components which are in-phase (line 18) and in quadrature (line 19) with respect to the carrier mode motion. It is the in-phase component 18 which gives the rate output signal. Both in-phase 18 and quadrature 19 signals are zero when either mode is aligned to the drive. The amplitude of the signal variation with mode angle is dependent upon the level of frequency split and will tend to zero at all points for perfectly balanced modes. In practice, there will always be a residual frequency split and hence a variation in the secondary pick-off signal with mode angle.

FIG. 5 shows the effect of introducing an error of $\epsilon_r = 1°$ for the same resonator parameters as FIG. 4. The effect is to shift the mean value of the in-phase response 18. The in-phase bias is thus a function of both mode alignment and secondary pick-off alignment. Therefore, in order to correctly set the secondary pick-off alignment ($\epsilon_r \rightarrow 0$), it is necessary to first accurately set the primary drive to carrier mode alignment. The quadrature signal 19 is insensitive to pick-off misalignment and is generally used as the error signal in setting the mode alignment during balancing.

To achieve the desired performance, the secondary pick-off alignment error needs to be controlled within small fractions of a degree. This level of accuracy is extremely difficult to achieve and invariably some degree of post manufacture adjustment is required. EP 0411489 B1 and GB 2272053 A describe the use of split-drive and pick-off transducers to perform the alignment. This is achieved by differentially adjusting the gains on the two halves of the transducer to shift the effective center. These techniques require the use of a non-standard transducer. For some vibrating structure gyro designs, the transducers are fixed on the resonator itself. Any non-standard transducer will adversely affect the dynamic symmetry between the two cos 2θ modes which may have a detrimental effect on the frequency split and hence on gyro performance.

The addition of the secondary pick-off alignment step to the balancing procedure puts a demanding tolerance on the mode alignment that must be achieved. The alignment of the mode and matching of the frequencies is an iterative process involving a number of steps. Setting tighter tolerances will inevitably require further iterations and will consequently take longer.

In order to achieve the low cost and high volumes required for future commercial markets, it is highly desirable to eliminate the requirement for a balancing procedure.

Modern micro-machining techniques offer the potential to manufacture planar ring resonators from Silicon, such as described in U.S. Pat. No. 5,226,321, to sufficient accuracy to achieve this goal. However, while this may be attainable it is unlikely that the primary drive to carrier mode alignment can be controlled accurately. In order to maintain the desired performance it will still be necessary to trim the secondary pick-off angle error.

There is thus a need for a generally improved process for reducing bias error in a vibrating structure sensor which preferably enables the secondary pick-off alignment to be adjusted without initially having to set the mode alignment. Advantageously, such adjustment should be achievable without the use of non-standard transducers.

According to one aspect of the present invention, there is provided a process for reducing bias error in a Vibrating Structure having a Vibrating Structure, primary and secondary drive means for causing the vibrating structure to vibrate at resonance and primary and secondary pick-off means for detecting vibration of the vibrating structure, which primary and secondary pick-off means are separated by a fixed angular amount with respect to the vibrating structure, characterized in that the vibrating structure is a substantially cylindrical or substantially planar ring- or hoop-like structure, and by including the steps of summing a proportion of the primary pick-off means output signal into the secondary pick-off means output signal or subtracting a proportion of the primary pick-off means output signal from the secondary pick-off means output signal, equivalent to reducing or increasing the angular separation of the secondary pick-off means from the primary drive means, by an amount sufficient to set the rate output signal from the vibrating structure to zero and thereby minimize bias error.

Conveniently, the fixed angular amount is 45°.

According to a second aspect of the present invention, there is provided a vibrating structure sensor having a vibrating structure, primary and secondary drive means for causing the vibrating structure, primary and secondary drive means for causing the vibrating structure to vibrate at resonance, and primary and secondary pick-off means for detecting vibration of the vibrating structure, which primary and secondary pick-off means are separated by a fixed angular amount with respect to the vibrating structure, characterized in that the vibrating structure is a substantially cylindrical or substantially planar ring- or hoop-like structure, and by including means for summing or subtracting a proportion of the primary pick-off means output signal into or from the secondary pick-off means output signal equivalent to reducing or increasing the secondary pick-off means angular separation from the primary drive means, by an amount sufficient to set the rate output signal from the vibrating structure to zero and thereby minimize bias error.

BRIEF DESCRIPTION OF THE DRAWINGS

For a better understanding of the present invention and to show how the same may be carried into effect, reference will now be made, by way of example, to the accompanying drawings, in which:

FIGS. 1A and 1B diagramatically illustrate a carrier mode and response mode of vibration respectively for a conventional Vibrating Structure Sensor ring resonator excited into a cos 2θ resonance mode.

FIG. 7 is a block diagram of the process according to the present invention for reducing bias error incorporating error compensation.

DETAILED DESCRIPTION

Figure 2:
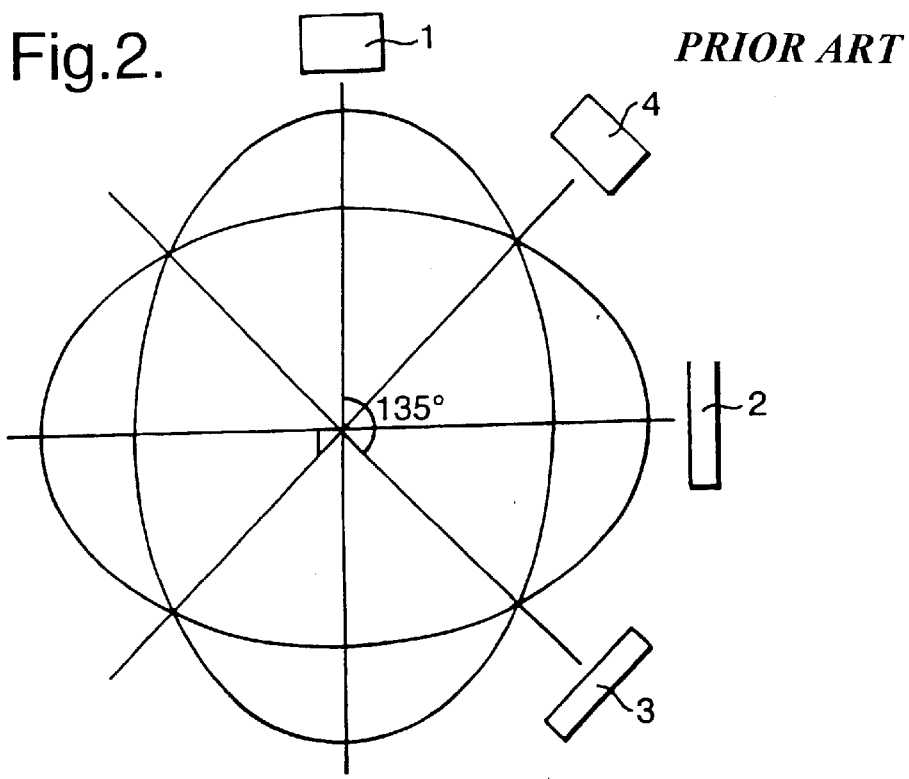
FIG. 2 is a schematic illustration of the orientation of drive means and pick-off means around a conventional known vibrating resonant structure.

The process of the present invention for reducing bias error is suitable for use with a vibrating structure sensor having a substantially cylindrical or substantially planar ring- or hoop-like vibrating structure, primary and secondary drive means 1, 4 for causing the vibrating structure to vibrate at resonance and primary and secondary pick-off means 2, 3, for detecting vibration of the vibrating structure. The means 1, 2, 3, 4 are arranged as shown in FIG. 2 of the accompanying drawings and the primary and secondary pick-off means 2, 3 are separated by a fixed angular amount, preferably 45°, with respect to the vibrating structure.

Figure 4:
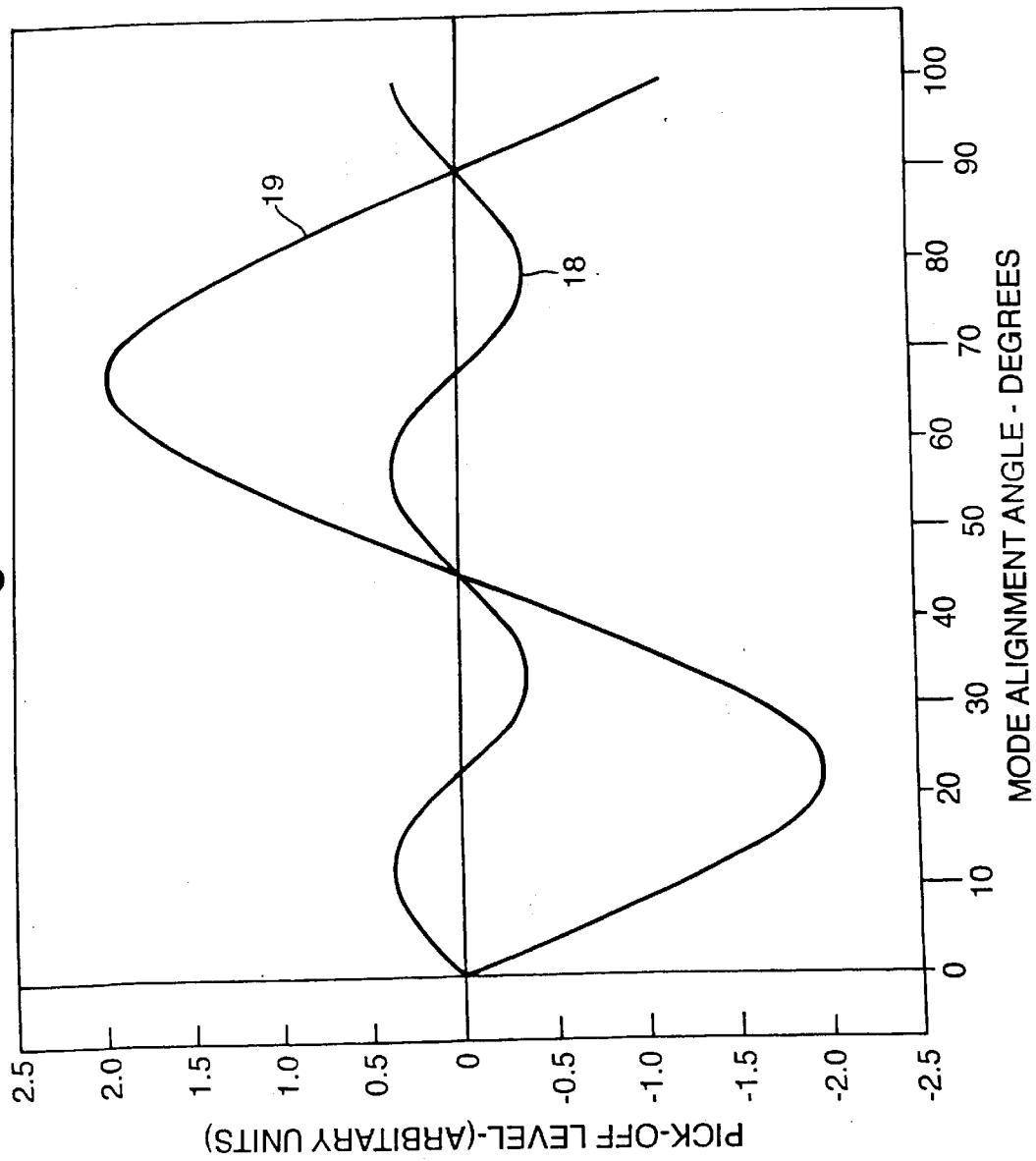
FIG. 4 is a graphical representation of pick-off level against mode alignment angle showing the response of a sensor not according to the present invention resolved into in-phase and quadrature components.
Figure 5:
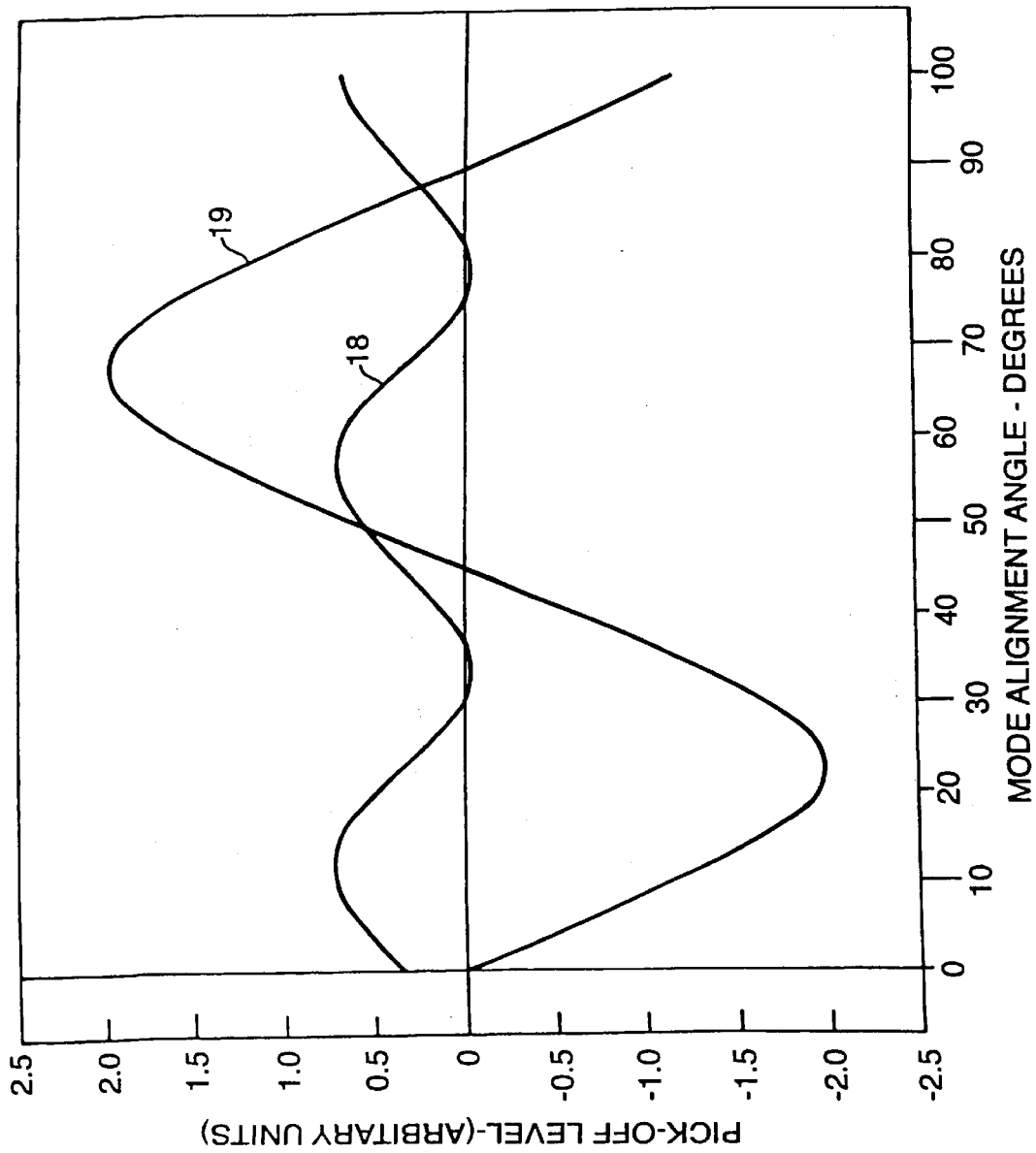
FIG. 5 is a graphic display of pick-off signal against mode alignment angle similar to that of FIG. 4 but showing the effect of introducing a 1° degree secondary pick-off alignment error for the same vibrating structure parameters as in FIG. 4.
Figure 6:
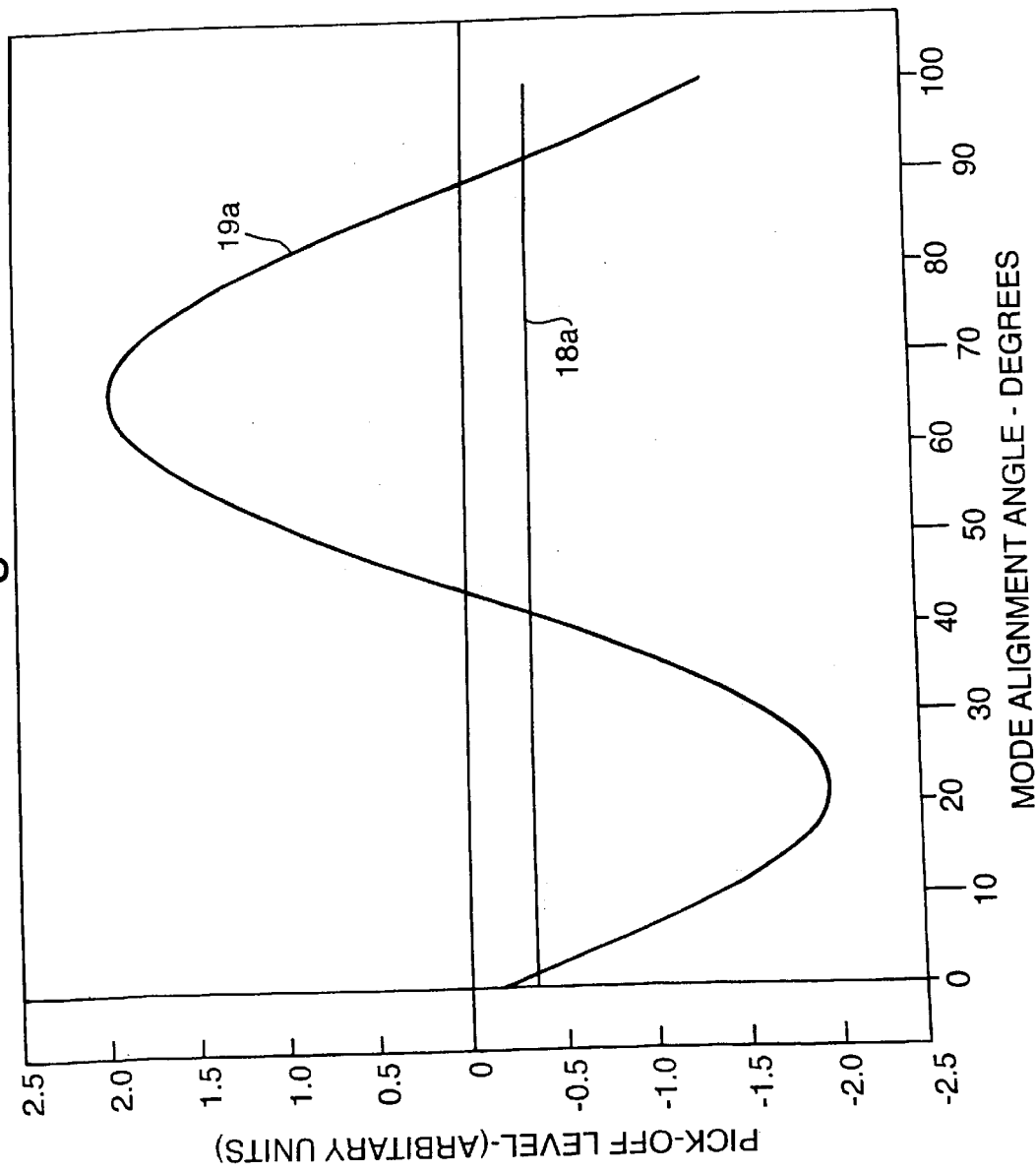
FIG. 6 is a graphic representation showing the secondary drive in-phase and quadrature components as a function of mode angle alignment for the same parameters as in FIG. 4 but according to the process of the present invention.

For the purposes of the present invention the open-loop modeling of the pick-off means responses may be extended to include the effect of nulling the secondary pick-off means output 10. In this case the in-phase and quadrature components of the secondary drive means 4 become of importance. FIG. 6 of the accompanying drawings shows the secondary drive components as a function of mode angle alignment for the same vibrating structure mode parameters as for the non-inventive FIG. 4 example with a 1° error. The quadrature drive has a functional form or line 19*a* similar to the open loop quadrature pick-off signal behavior 19 of FIG. 4. However, the in-phase response component line 18*a* is dramatically different and exhibits no mode angle sensitivity. The fixed offset level is determined by the magnitude of $\epsilon_r$. Performing the secondary pick-off adjustment with the sensor operating in a closed-loop configuration therefore enables this source of error to be trimmed out without requiring the modes accurately to be aligned.

In order to implement the bias error reduction or trimming procedure, it is necessary to adjust the effective position of the secondary pick-off means 3 within the feedback loops. As shown in FIG. 2 of the accompanying drawings, the primary pick-off means 2 is located 45° around from the secondary pick-off means 3. The effective center point of the secondary pick-off means 2 may therefore be shifted in this direction by summing a proportion of the primary signal into the secondary. The vibrating structure motion at the point 45° in the other direction from the secondary pick-off means 3 will be 180° out of phase with the motion at the primary pick-off means 2 but otherwise identical. The effective position of the secondary pick-off means 3 can thus be shifted in the other direction by subtracting a proportion of the primary pick-off.

Thus, in the process of the present invention for reducing bias error, a proportion of the primary pick-off means output signal 10 is summed into the secondary pick-off means output signal 15 or a proportion of the primary pick-off means output signal 10 is subtracted from the secondary pick-off means output signal 15 equivalent to reducing or increasing the angular separation of the secondary pick-off means 3 from the primary drive means 1 by an amount sufficient to set the rate output signal from the vibrating structure to zero and thereby minimize bias error.

Figure 3:
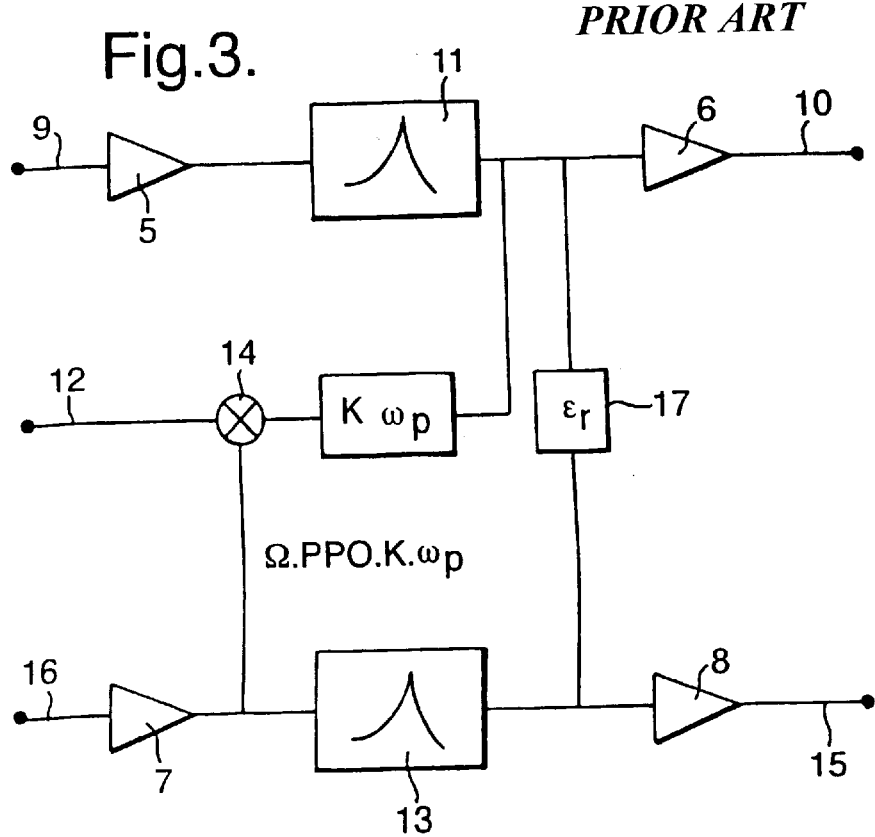
FIG. 3 is a simplified block diagram of a conventional vibrating structure sensor control system operation not according to the present invention.

This compensation system according to the invention can be incorporated into the system block diagram as shown in FIG. 7 which is basically similar to the block diagram of FIG. 3 and in which like parts will be given like reference numerals to those of FIG. 3 and will not therefore be described in further detail. As shown in FIG. 7, means for adjusting the secondary pick-off means 3 effective angular separation from the primary drive means 1 by an amount sufficient to set the rate output signal from the vibrating structure to zero and thereby minimize bias error is provided between the primary pick-off output 10 and the secondary pick-off output 15. This latter means is a trim means 20 whereby the secondary pick-off angle trim is adjusted to set the rate output signal to zero. This results in no net force being applied to excite the response mode in the absence of rotation. The force applied to the vibrating structure is now an accurate representation of the applied rate.

The present invention has inherent advantages over those described in EP 0411489 B1 and GB 2272053 A which require the use of non-standard transducers for the pick-off means. The present invention can use standard transducers and thus maintains a symmetry consistent with the Cos 2θ mode dynamics. Use of standard modules is also advantageous as any scaling changes such as temperature dependent gains, will be largely identical for all modules and the resultant errors will therefore tend to cancel out.

What is claimed is:

1. A process for reducing bias error in a vibrating structure sensor comprising:

a vibrating structure, primary and secondary drive means for causing the vibrating structure to vibrate at resonance and primary and secondary pick-off means for detecting vibration of the vibrating structure, which the primary and secondary pick-off means are separated by a fixed angular amount with respect to the vibrating structure, wherein the vibrating structure is a substantially cylindrical or substantially planar ring- or hoop-like structure, and including the steps of summing a proportion of a primary pick-off means output signal into a secondary pick-off means output signal or subtracting a proportion of the primary pick-off means output signal from the secondary pick-off means output signal, equivalent to reducing or increasing the angular separation of the secondary pick-off means from the primary drive means by an amount sufficient to set a rate output signal from the vibrating structure to zero and thereby minimize bias error.

2. A process according to claim 1, in which the fixed angular amount is 45°.

3. A vibrating structure sensor comprising:

a vibrating structure, primary and secondary drive means for causing the vibrating structure to vibrate at resonance, and primary and secondary pick-off means for detecting vibration of the vibrating structure, which primary and secondary pick-off means are separated by a fixed angular amount with respect to the vibrating structure, wherein the vibrating structure is a substantially cylindrical or substantially planar ring- or hoop-like structure, and means are included for summing or subtracting a proportion of a primary pick-off means output signal into or from a secondary pick-off means output signal equivalent to reducing or increasing the secondary pick-off means angular separation from the primary drive means, by an amount sufficient to set a rate output signal from the vibrating structure to zero and thereby minimize bias error.

* * * * *

UNITED STATES PATENT AND TRADEMARK OFFICE
CERTIFICATE OF CORRECTION

PATENT NO. : 6,698,271 B1
DATED : March 2, 2004
INVENTOR(S) : Christopher Paul Fell et al.

It is certified that error appears in the above-identified patent and that said Letters Patent is hereby corrected as shown below:

Column 1,
Line 9, after "particularly" insert -- , --.
Line 14, after "sensors" insert -- , --; after "gyroscopes" insert -- , --.
Line 18, after "ture" insert --, --.
Line 23, after "structure" insert -- , --.
Line 26, after "rotated" insert -- , --.
Line 65, after "FIG. 3" insert -- , --.

Column 2,
Line 31, change "Biase ∝" to -- Bias ∝ --.
Line 60, after "performance" insert -- , --.

Column 3,
Line 53, after "attainable" insert -- , --.

Column 5,
Line 10, after "invention" insert -- , --.
Line 13, after "case" insert -- , --.

Column 6,
Line 12, after "changes" insert -- , --.

Signed and Sealed this

Fifth Day of October, 2004

JON W. DUDAS
*Director of the United States Patent and Trademark Office*